(No Model.) 2 Sheets—Sheet 1.
J. W. JAIMISON.
CHILD'S CARRIAGE.
No. 526,972. Patented Oct. 2, 1894.
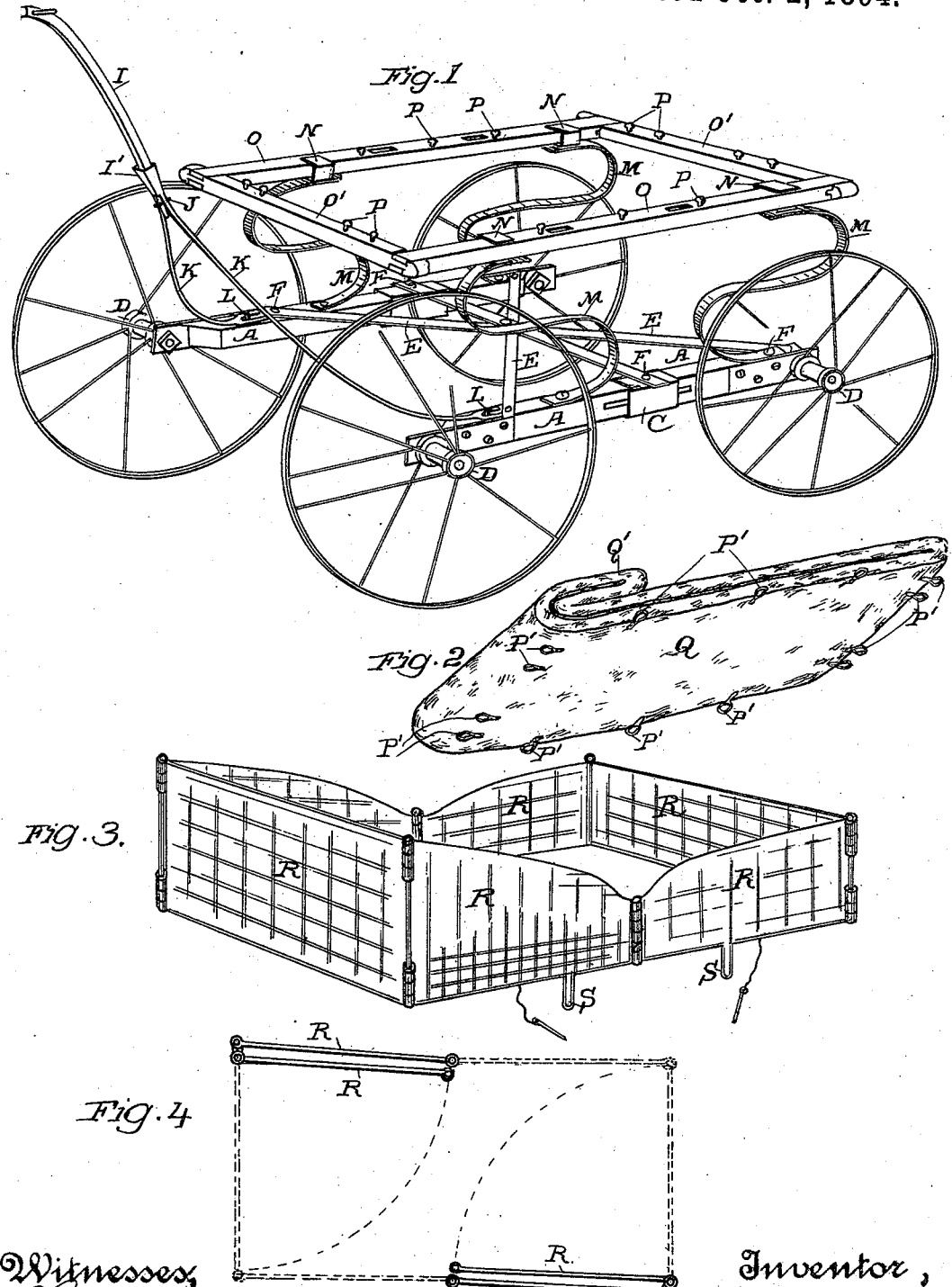

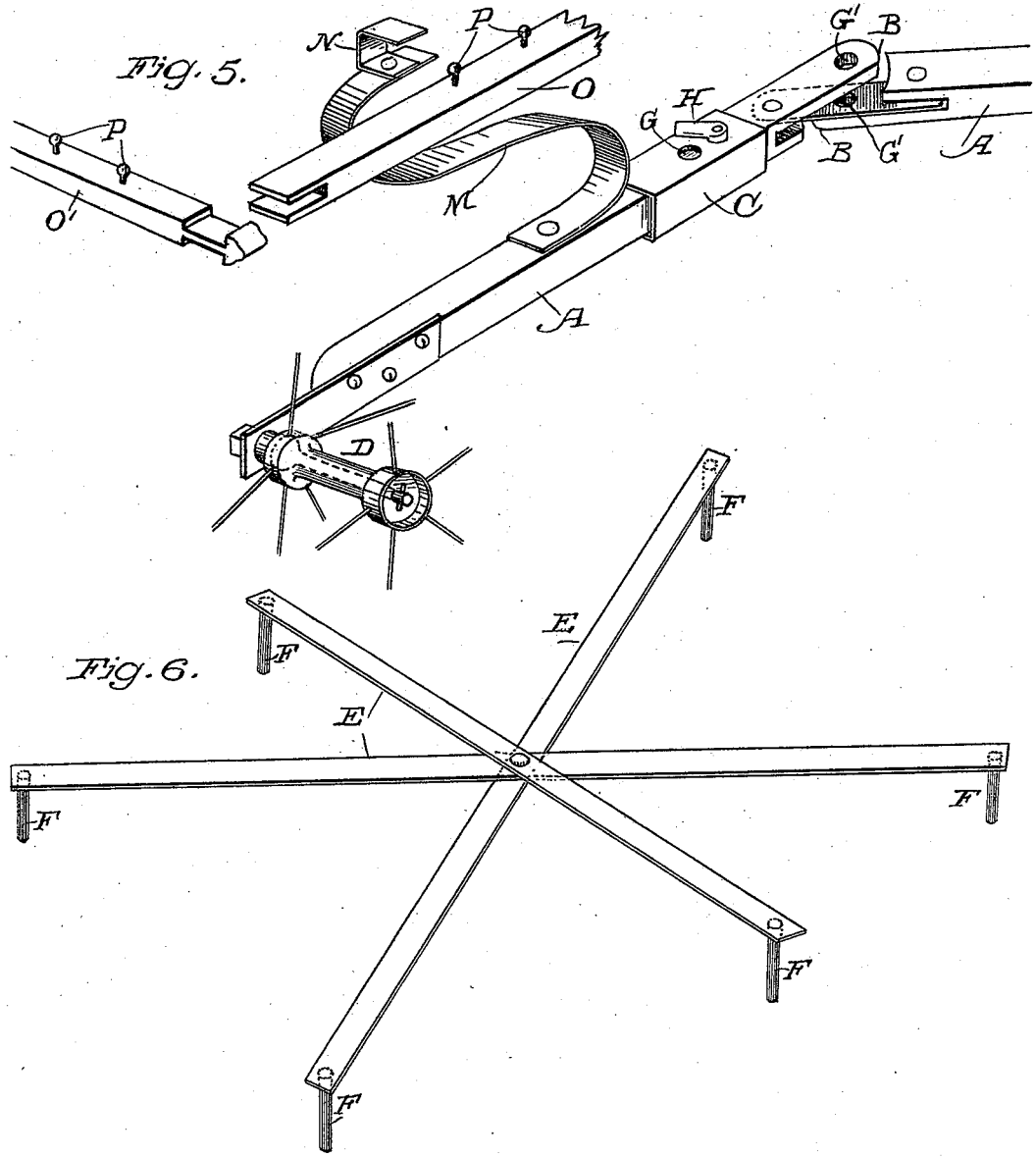

UNITED STATES PATENT OFFICE.

JOHN W. JAIMISON, OF VALLEJO, CALIFORNIA.

CHILD'S CARRIAGE.

SPECIFICATION forming part of Letters Patent No. 526,972, dated October 2, 1894.

Application filed May 16, 1894. Serial No. 511,457. (No model.)

*To all whom it may concern:*

Be it known that I, JOHN W. JAIMISON, a citizen of the United States, residing at Vallejo, county of Solano, State of California, have invented an Improvement in Children's Folding Carriages; and I hereby declare the following to be a full, clear, and exact description of the same.

My invention relates to an improvement in carriages for children.

It consists essentially in a novel means for disengaging and folding the parts of the carriage so that they may be easily transported from place to place and easily set up wherever it may be desired to use the vehicle.

Referring to the accompanying drawings for a more complete explanation of my invention,—Figure 1 is a view of the framework of a carriage connected together. Fig. 2 is a view of the bag or sack within which the parts are transported, said bag being folded and adapted to be attached to the frame-work to form a bed. Fig. 3 is a view of the body of the vehicle ready to be attached to the top frame. Fig. 4 is a view of this body partially folded. Fig. 5 is a perspective view of frame-work showing one spring and wheel hub. Fig. 6 is a view of the connecting braces. Fig. 7 shows part of the frame and two wheels folded.

The object of my invention is to provide a child's carriage so constructed that when not in use, it may be folded up into a compact form for storage and for transportation, where it is necessary to travel for some distance before a place is reached where the carriage can be used.

A A are the main frames or side bars of the vehicle, jointed as shown at B (Fig. 5) and provided with sliding clasps C which are adapted to slip over these joints when the two parts A A are in straight line, and thus hold them in that position.

The two jointed frames A form the side timbers of the main frame and they have axles fixed to project from their ends upon which the hub D of the wheels are fitted to revolve. In order to retain these parts in proper position I have shown brace bars E which cross each other at the points near the center where they are pivoted together, so that when not in use, they may be folded up and form essentially a single bar. At the end of each of these bars is a pin F projecting at right angles and these pins are adapted to enter holes which are made in the side bars A to receive them, and also through the slides C, as shown at G, and the corresponding overlapping parts of the joint as shown at G', Fig. 5. The shortest of the bars E extend directly across between the two joint slides C, and the two longer ones extend diagonally across as shown plainly in Fig. 1, and are similarly fixed to the side bars A, near the ends, so that the structure is very rigidly secured.

H (Fig. 5) is a latch or plate pivoted and adapted to swing over the end of the brace bar after the pin has been inserted in the opening. Latches of this description are adapted to lock each of the ends of the braces so that they will not be separated from the side bars.

The handle bar I is made tapering at the lower end, and fits into a correspondingly tapered socket I' so that it makes a snug joint, and is secured in place by means of a pin J passing through the lower end.

From the socket I' the elastic rods K branch outwardly and are curved so as to fit upon the ends of the rear bars A of the frame. The ends of these branches have slots made in them which are adapted to fit upon pins L fixed to the frame, and they bind upon these pins with sufficient tension to retain the handle in place without other fastening, at the same time allowing it to be removed by a slight pull when necessary to dismount the parts.

M M are S-shaped springs, the lower ends of which are fastened to the side bars A, and upon the upper ends are fixed clasps N which slip snugly upon the side bars O of the frame which forms the bed of the carriage. The end bars O' of this frame are doweled or otherwise fitted to slip into corresponding slots in the ends of the bars O, and thus form a rectangular frame which serves as the bed for the upper part of the carriage. Upon these bars O O' are pins P having heads upon them and to these pins are attached loops P' which are fixed upon the sack Q in such a manner that when the latter is folded after the parts of the carriage have been removed from it, these loops are upon its edges and are easily hooked upon the pins P of the bed, thus retaining this sack so as to form a bottom for the carriage. The sack is of such a length that it is folded over as shown at Q' (Fig. 2), and this folded over portion forms a raised pillow or seat at one end of the carriage.

The body is composed of side and end boards R hinged together at the angles, and the side boards are also hinged at the center, so that they may all be folded up together as indicated in Fig. 4. When unfolded they form a rectangular box or body as shown at Fig. 3, and this is provided with pins or stanchions S which fit into corresponding holes in the body frame timbers O and they may be secured in place by means of pins passing transversely through holes in the bottom of the stanchions S beneath the timbers so that the body is firmly secured thereto.

The whole apparatus is thus easily held in shape, and makes a sufficiently rigid carriage for all ordinary purposes of conveying children.

When it is to be transported, the body is first removed from the bed timbers and is folded up into compact form, as partially shown in Fig. 4, the sack Q is removed from the timbers O O', the latter are separated from each other and from the springs, the brace timbers E are removed from the side bars A, and folded together, and the slides C being moved back from the joint B of the timbers A, the latter may be folded together so as to bring the pair of wheels upon one side to lie one against the other as shown plainly in Fig. 7, each side being folded in this manner.

The parts are all sufficiently compact to be placed in the sack, and the latter is easily carried in the hand to any point, and may be stored without occupying any considerable amount of space.

Having thus described my invention, what I claim as new, and desire to secure by Letters Patent, is—

1. A carriage consisting of side bars having wheels journaled upon the opposite ends and joints intermediate between these ends, in combination with slides adapted to slip over said joints and be locked thereon, and diagonal braces extending between the two side frames.

2. A folding carriage consisting of the side bars having wheel axles fixed to their opposite ends, joints intermediate between these ends whereby each side may be folded upon itself without removing the wheels, sliding sleeves adapted to fit over said joints when the parts of the side bars are in line, to retain them in this position, diagonal brace bars pivoted together in the center, having pins upon the ends adapted to enter corresponding holes in the side bars, and also to pass through the sleeves and joints of the same, whereby they are locked together.

3. A child's carriage consisting of the jointed folding side bars having wheels journaled upon the ends, joint clasps and braces, and springs fixed to the side bars, a bed frame consisting of side and end bars jointed together and clasps by which they are attached to the springs, together with a flexible containing sack folded to form a bed for said frame with a pillow at one end and having loops along its edges whereby it is secured to said frame.

4. A folding carriage consisting of the jointed side bars having wheels at the ends, joint clasps and diagonal braces whereby said side bars are fixed in position, springs fixed to said bars, a bed-frame for the body, and a flexible bottom with means whereby it is secured to the bed-frame, a body composed of sides and ends jointed together at the corners, said sides being also jointed in the center whereby they may be folded together for transportation, and stanchions by which the body is secured to the bed-frame.

5. A child's carriage having the folding side bars, bed-frame and body, a tapering socket piece into which the lower end of the handle is fitted and locked, and branch arms extending therefrom to the side bars with slotted ends and pins for attaching them thereto.

In witness whereof I have hereunto set my hand.

J. W. JAIMISON.

Witnesses:
A. WHITE,
T. JONES.